(12) United States Patent
Yarus et al.

(10) Patent No.: US 10,529,144 B2
(45) Date of Patent: Jan. 7, 2020

(54) LOCAL UPDATING OF 3D GEOCELLULAR MODEL

(71) Applicant: Landmark Graphics Corporation, Houston, TX (US)

(72) Inventors: Jeffrey Marc Yarus, Houston, TX (US); Genbao Shi, Sugar Land, TX (US); Richard L. Chambers, Bixby, OK (US); Veronica Liceras, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/891,308

(22) PCT Filed: Aug. 23, 2013

(86) PCT No.: PCT/US2013/056388
§ 371 (c)(1),
(2) Date: Nov. 13, 2015

(87) PCT Pub. No.: WO2015/026365
PCT Pub. Date: Feb. 26, 2015

(65) Prior Publication Data
US 2016/0163116 A1 Jun. 9, 2016

(51) Int. Cl.
*G06T 19/20* (2011.01)
*G06T 17/05* (2011.01)
*G01V 99/00* (2009.01)

(52) U.S. Cl.
CPC ............ *G06T 19/20* (2013.01); *G01V 99/005* (2013.01); *G06T 17/05* (2013.01); *G06T 2219/2016* (2013.01)

(58) Field of Classification Search
CPC .. G01V 99/005; G01V 1/302; G01V 2210/64; G01V 2210/66; G01V 1/28;
(Continued)

(56) References Cited

U.S. PATENT DOCUMENTS 6,549,854 B1 4/2003 Malinverno et al.
2005/0231530 A1 10/2005 Liang et al.
(Continued)

FOREIGN PATENT DOCUMENTS

EA 200700634 A1 8/2008
RU 2321064 C2 3/2008
(Continued)

OTHER PUBLICATIONS

International Search Report, dated Apr. 25, 2014; 3 pages; Korean International Searching Authority.
(Continued)

*Primary Examiner* — Xiao M Wu
*Assistant Examiner* — Scott E Sonners

(57) ABSTRACT

The disclosed embodiments include a method, apparatus, and computer program product for modifying a three-dimensional geocellular model. For example, one disclosed embodiment includes a system that includes at least one processor and at least one memory coupled to the at least one processor. The memory stores instructions that when executed by the at least one processor performs operations that includes loading into memory a three-dimensional geocellular model that corresponds to a two-dimensional geological model. The operations include determining a portion of the three-dimensional geocellular model affected by a change to the two-dimensional geological model and performing a local update to the portion of the three-dimensional geocellular model affected by the change.

14 Claims, 14 Drawing Sheets

(58) Field of Classification Search
CPC .... G01V 2210/624; G01V 1/306; G01V 1/32; G01V 2210/40; G01V 2210/642; G01V 2210/643; G01V 2210/661; G01V 2210/665; G06F 17/5009; G06F 17/10; G06F 17/50; G06T 17/05; G06T 19/20; G06T 15/08; G06T 19/00; G06T 17/00; G06T 2200/04; G06T 2200/24
See application file for complete search history.

(56) References Cited

U.S. PATENT DOCUMENTS

| | | |
|---|---|---|
| 2008/0294387 A1 | 11/2008 | Anderson et al. |
| 2009/0299709 A1 | 12/2009 | Liu |
| 2011/0074766 A1 | 3/2011 | Page et al. |
| 2011/0106514 A1 | 5/2011 | Omeragic et al. |
| 2012/0215513 A1* | 8/2012 | Branets ............. G01V 99/00 703/10 |
| 2014/0236559 A1* | 8/2014 | Fung ................. E21B 41/00 703/10 |

FOREIGN PATENT DOCUMENTS

| | | | |
|---|---|---|---|
| RU | 2007105679 A | 8/2008 | |
| WO | WO 2010/065209 A2 | 6/2010 | |
| WO | WO-2012096663 A1 * | 7/2012 | ............. G01V 1/40 |

OTHER PUBLICATIONS

Intellectual Property Office of Singapore, Invitation to Respond to Written Opinion & Search Report, dated Jul. 12, 2016, 9 pages, Singapore.
Kunal Rathod, Static Model Development, 2012-2013, 34 pages, www.slideshare.net/KunalRathod2/static-model-development.
The Federal Institute of Industrial Property, Office Action English Translation, dated Aug. 9, 2016, 5 pages, Russia.
The Federal Institute of Industrial Property, Office Action, dated Aug. 9, 2016, 6 pages, Russia.

* cited by examiner

LOCAL UPDATING OF 3D GEOCELLULAR MODEL

CROSS-REFERENCE TO RELATED APPLICATIONS

This application is a U.S. National Stage patent application of International Patent Application No. PCT/US2013/056388, filed on Aug. 23, 2013, the benefit of which is claimed and the disclosure of which is incorporated herein by reference in its entirety.

BACKGROUND OF THE INVENTION

1. Field of the Invention

The present invention generally relates to the field of computerized reservoir modeling, and more particularly, to a system and method configured to enable local updating of a three-dimensional (3D) geocellular model.

2. Discussion of the Related Art

In the oil and gas industry, reservoir modeling involves the construction of a computer model of a petroleum reservoir, for the purposes of improving estimation of reserves and making decisions regarding the development of the field.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1A:
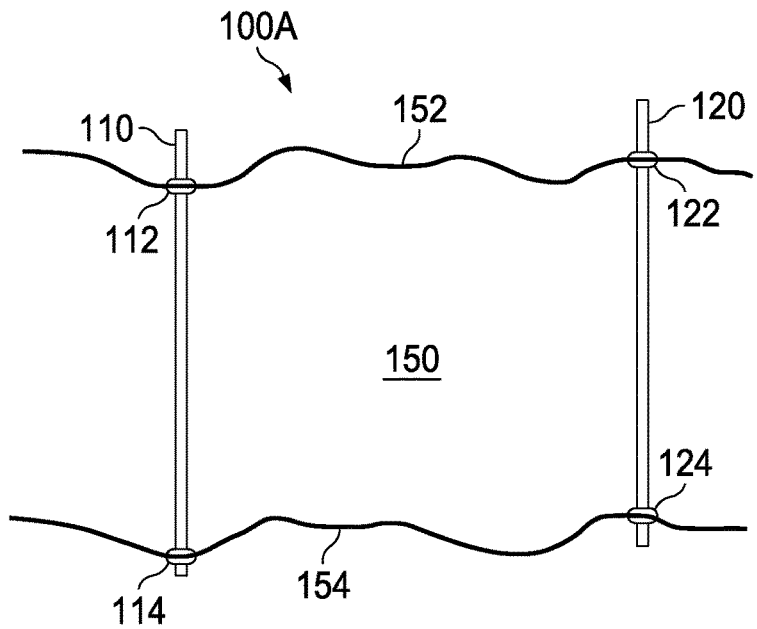
FIG. 1A is a diagram illustrating a two-dimensional view of two wells intersecting the top and bottom of a formation in accordance with the disclosed embodiments.

A reservoir model represents the physical space of the reservoir by an array of discrete cells, delineated by a grid which may be regular or irregular. One type of reservoir model is a geological model that is created by geologists and geophysicists. The geological model provides a static description of the reservoir prior to production. For example, the DecisionSpace® software application available from Landmark Graphics Corporation includes a geology module that allows a geologist to create a geological model that identifies formation tops and bases associated with one or more wells of a reservoir. Other reservoir modeling applications may have similar modules and/or functions.

In one embodiment, to identify the formation tops and bases associated with the one or more wells of a reservoir, a geologist examines data gathered from the one or more well sites. For example, the geologist may review data from a well log that provides a one dimensional view of the earth from the top to a particular depth. For instance, the well log may provide a graph that has depth on the vertical axis and one or more electrical or geological properties on the horizontal axis. The patterns from the well logs allow the geologists to estimate, among other things, where a top of a formation occurs as certain changes in the well logs are good indicators of changes between different formations. In one embodiment, a string of wells may be displayed at the same scale in a two-dimensional view showing the various properties along a vertical depth. From this two-dimensional view, a geologist can determine the top of a formation as he/she moves from well to well (e.g., the top of the formation may dip between well A and well B, remain level between well B and well C, rise between well C and well D, etc.). Once the geologist finalizes the geological model, a three-dimensional (3D) geocellular model/earth model may be generated for performing reservoir simulation.

However, currently, if changes are made to a geological model (e.g., a top of a formation is moved or a new well is added), the 3D geocellular model must be completely regenerated/rebuilt to comply with the updated geological model. Thus, even simple modifications, such as changing the location of a formation top associated with a well or adding a new well may result in a delay due to the time needed to rebuild the 3D geocellular model.

Accordingly, the disclosed embodiments include a system and method for providing local updating of a 3D geocellular model in response to a change in a geological model. The disclosed embodiments and advantages thereof are best understood by referring to FIGS. 1-14 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1A is a diagram illustrating a simplistic two-dimensional view 100A of two wells (110 and 120) intersecting a top 152 and a bottom 154 of a formation 150 corresponding to a geological model in accordance with the disclosed embodiments. In the depicted embodiment, the well 110 intersects the formation 150 at a top 112 and a bottom 114. The well 120 intersects the formation 150 at a top 122 and a bottom 124. The thickness of the formation 150 may range from less than a meter to several thousand meters. Although the well 110 and the well 120 are depicted as being a straight vertical line, the well 110 and the well 120 may include bends and curves at multiple points and in multiple directions throughout the length of the wells.

Figure 1B:
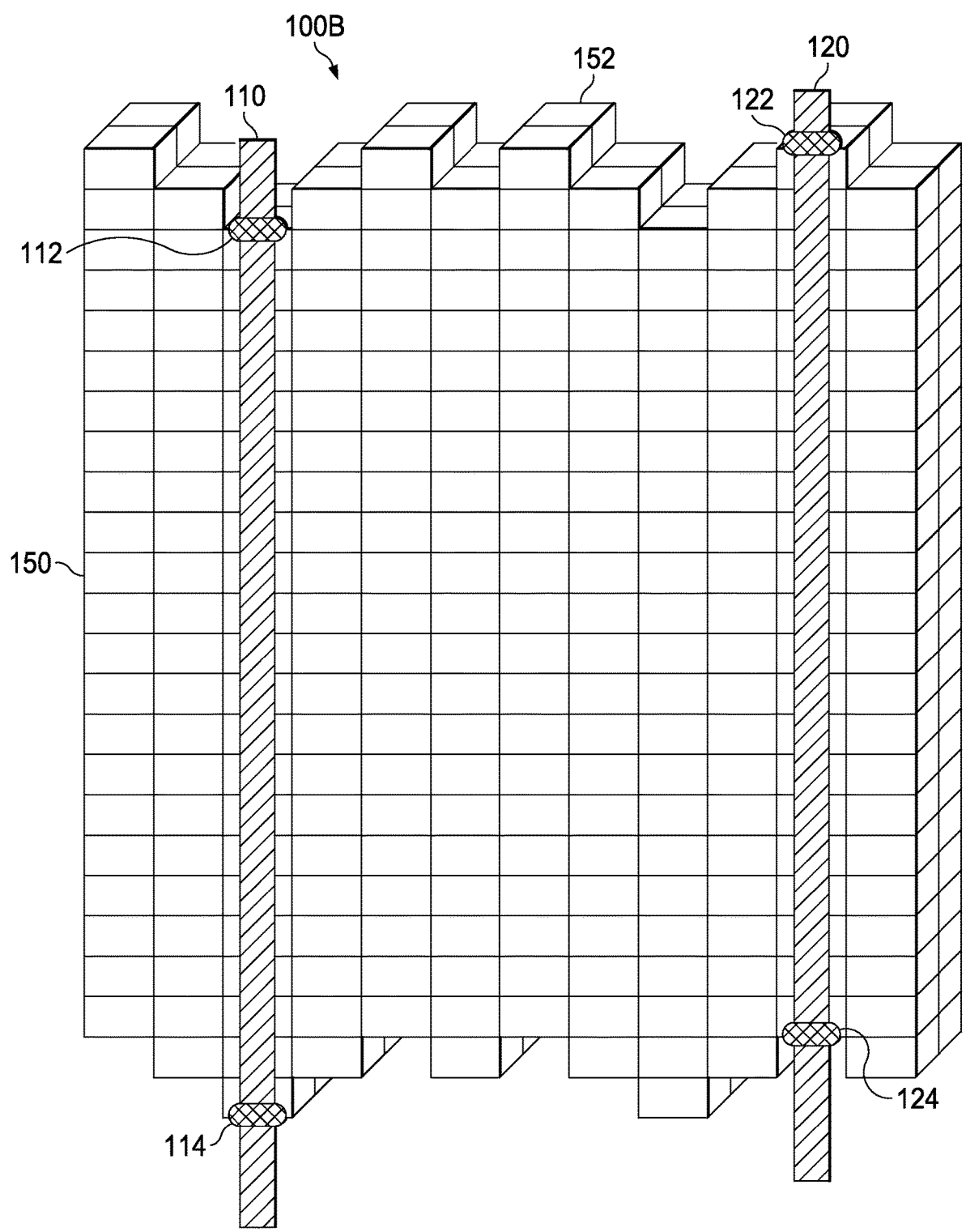
FIG. 1B is a diagram illustrating an example of a portion of a three-dimensional geocellular grid corresponding to the two-dimensional view of FIG. 1A in accordance with the disclosed embodiments.

FIG. 1B is a diagram illustrating an example of a portion of a three-dimensional geocellular grid 100B corresponding to the two-dimensional view 100A of FIG. 1A in accordance with the disclosed embodiments. Generally, the three-dimensional geocellular grid 100B is required before any interpolation methods can be formed. The three-dimensional geocellular grid 100B comprises a plurality of cells/nodes that represent/correspond to the formation 150.

In one embodiment, the three-dimensional geocellular grid 100B may be created using either a parallel layering style or a proportional style. In a parallel layer style, all the cells are the same size (i.e., constant thickness) and parallel to one another. In contrast, in a proportional layering style, the cell layers are equidistant between the top and bottom horizons of the interval and produces thick cells where the top and base are far apart and thin cells when the layers become thinner.

For purposes of illustration only, the three-dimensional geocellular grid 100B utilizes a parallel layering style in that all the cells are the same size and parallel to one another. However, the disclosed embodiment is applicable to any type of layering style such as proportional layering.

The three-dimensional geocellular grid 100B includes the corresponding wells 110 and 120 blocked onto the three-dimensional geocellular grid 100B. In addition, the top 112 and bottom 114 of well 110, and the top 112 and the bottom 124 of well 120 are also indicated in FIG. 1B.

As discussed above, currently if a change is made to the two-dimensional view geological model, the entire three-dimensional geocellular grid, a portion of which is shown in FIG. 1B, has to be completely regenerated/rebuilt to adjust for the change. Thus, the disclosed embodiments seek to provide one or more solutions to the above problem by enabling local updating of a 3D geocellular model to correspond to a change in the geological model without having to completely rebuild the 3D geocellular model.

Figure 2:
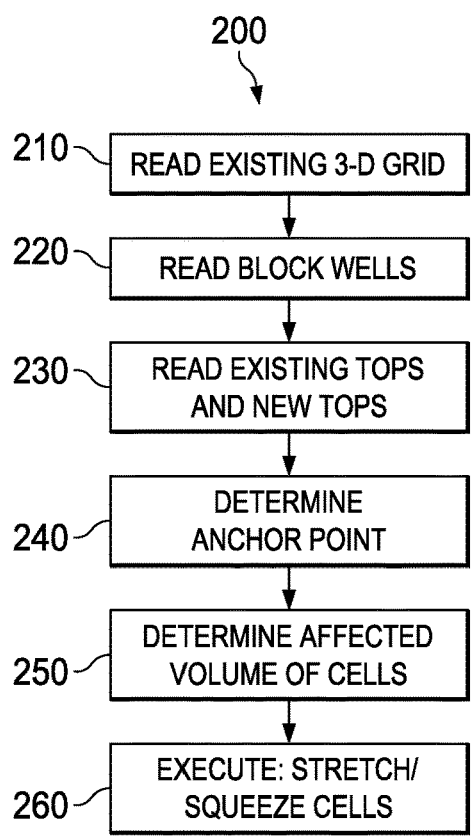
FIG. 2 is a flowchart illustrating a method for locally updating a top of a formation of a three-dimensional geocellular grid in accordance with the disclosed embodiments.
Figure 3:
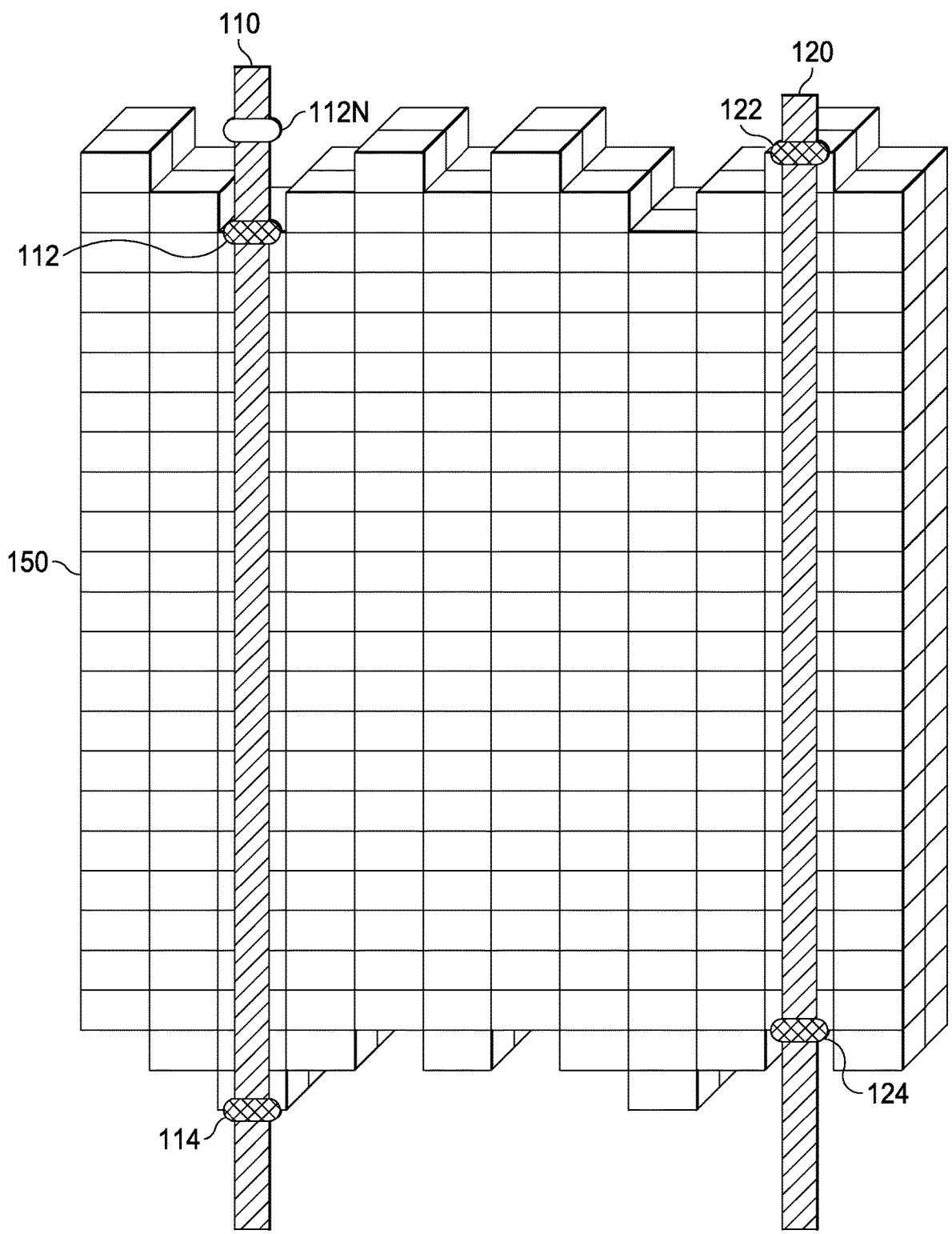
FIG. 3 is a diagram illustrating a three-dimensional geocellular grid in which a new top of a formation associated with a well is selected in accordance with the disclosed embodiments.

For example, with reference now to FIG. 2, a flowchart illustrating a method 200 for locally updating a top of a formation associated with the well on a three-dimensional geocellular grid is presented in accordance with the disclosed embodiments. The method 200 begins by reading in/loading into memory an existing three-dimensional geocellular grid at step 210. At step 220, the process determines the location of all the blocked (upscaled) wells on the existing three-dimensional geocellular grid. A blocked well is one that is modified from its original state of fine resolution to a coarser resolution consistent with the cells it passes through in the geocellular grid. In other words, the process determines where wells exist with respect to the existing three-dimensional geocellular grid such as indicated in FIG. 1B. At step 230, the process determines/reads the existing and new top data for one or more wells for which the top of the well has been modified in the geological model. For example, for illustration purposes, FIG. 3 illustrates a scenario in which the top 112 of the well 110 of FIGS. 1A and 1B has been adjusted to a new location indicated by top 112N shown in FIG. 3.

At step 240, the process determines an anchor point for performing a local update of the 3D geocellular model to adjust to the new top. Non-limiting examples of anchor points that may be used with the disclosed embodiments include a bottom anchor point, a top anchor point, and an intermediate point along the blocked well. In some embodiments, the process selects an anchor point based on one or more factors such as, but not limited to, minimizing the visual effects caused by the modification, preventing modifications to certain cells or wells, and minimizing the number cells affected by the modification. Alternatively, and/or in addition to, in some embodiments, the process may receive a user input that indicates a desired anchor point.

At step 250, the process determines the affected volume of cells between the anchor point in the new top within the 3D geocellular model that must be adjusted locally on the 3D geocellular model to correspond to the change to the location of the top. In one embodiment, the process may determine the affected volume of cells/area of influence caused by the change based on a ratio of the maximum and minimum range from a variogram/spatial model. In another embodiment, the user may define the area of influence. For example, in one embodiment, the process receives a user input of a drawn closed shape on a map view or section view of the 3D geocellular model to indicate the volume/area of influence. Alternatively, and/or in addition to, in some embodiments, the process may receive a user input specifying a ratio of height to width (or width to height) to control the volume/area of influence in the 3D geocellular model.

At step 260, the process executes a stretch or squeeze procedure on the nodes/cells in the affected volume to adjust for the new location of the top corresponding to the well. The cells along the block well between the anchor point and the new top are affected the most by the change and the change is gradually decrease as it spreads out to the affected volume/neighboring cells. No cells are added or deleted from the 3D geocellular model in performing the stretch or squeeze procedure.

Figure 4:
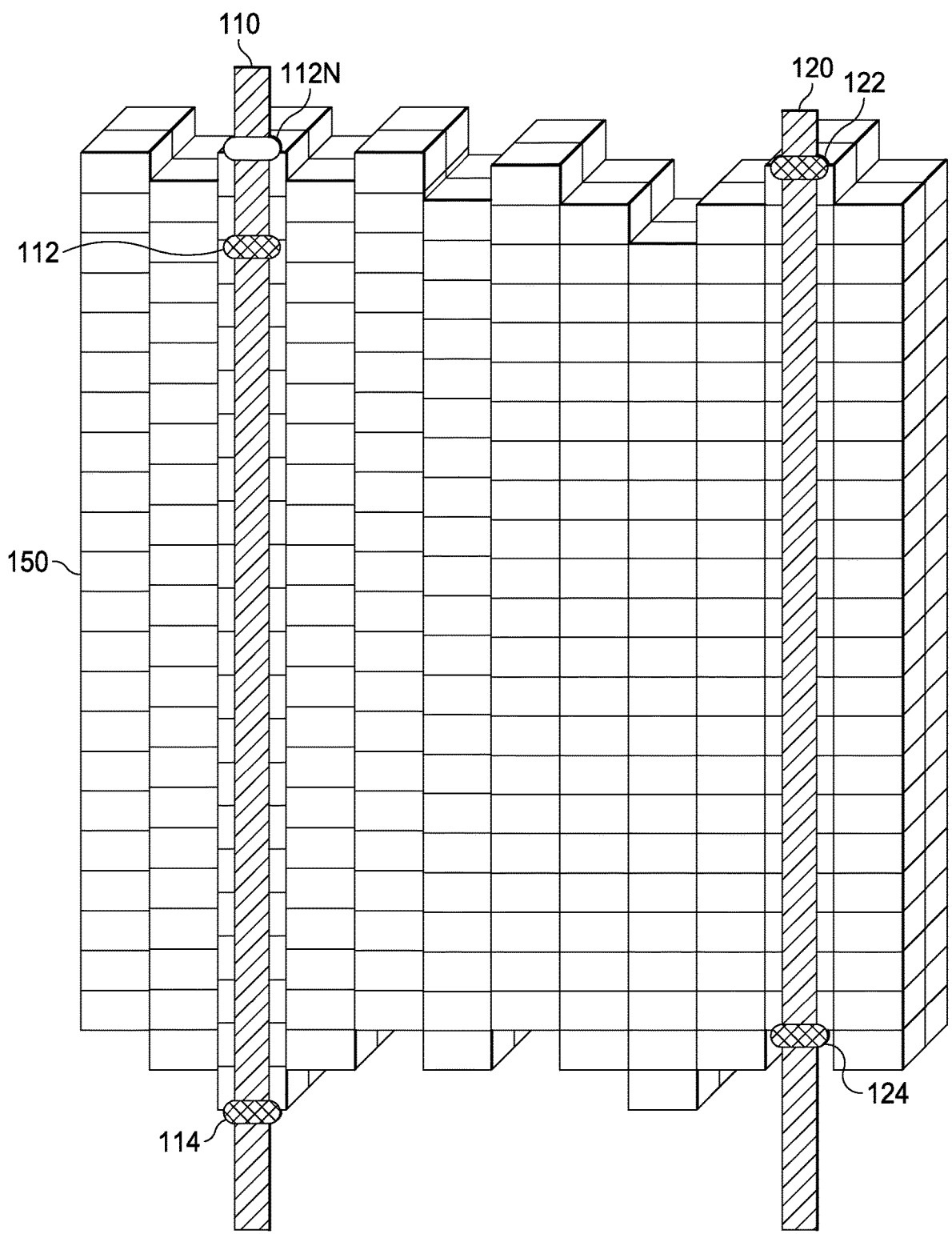
FIG. 4 is a diagram illustrating a first modification to the three-dimensional geocellular grid based on the indicated new top of the formation associated with the well of FIG. 3 in accordance with the disclosed embodiments.

For example, FIG. 4 illustrates a modification to the portion of the 3D geocellular model depicted in FIG. 3 based on the indicated new top 112N of the formation 150 associated with the well 110 in accordance with the disclosed embodiments. In the depicted embodiment, the bottom 114 of well 110 is used as an anchor point for performing the stretching of the cells. As can be seen in comparison to FIG. 3, the cells/nodes along the blocked well 110 (i.e., the $3^{rd}$ column from the left) is stretched to the new top 112N. The neighboring volumes of cells (e.g., the 1st, 2nd, 4th, 5th, and 6th column of cells, from left to right) are also affected by the local modification to the 3D geocellular model due to the new top 112N. According to the disclosed embodiments, the change to the $2^{nd}$ and $4^{th}$ column are less than the change to the $3^{rd}$ column, and the change to the $1^{st}$ and $5^{th}$ column are less than the change to the $2^{nd}$ and $4^{th}$ column, and so on, until the change is dispersed to the volume of affected cells. Although the depicted diagram illustrates the change in 2D, changes to the cells are performed in 3D, meaning that cells in front and behind of the affected columns within the volume of interest are also modified accordingly.

As can be seen from FIG. 4, the area of the 3D geocellular model affected by the local update no longer incorporates a parallel layering style, but instead incorporates a proportional layering style. Thus, the disclosed embodiments include a system and method for creating a 3D geocellular model that includes multiple types of layering styles due to the local updates.

Figure 5:
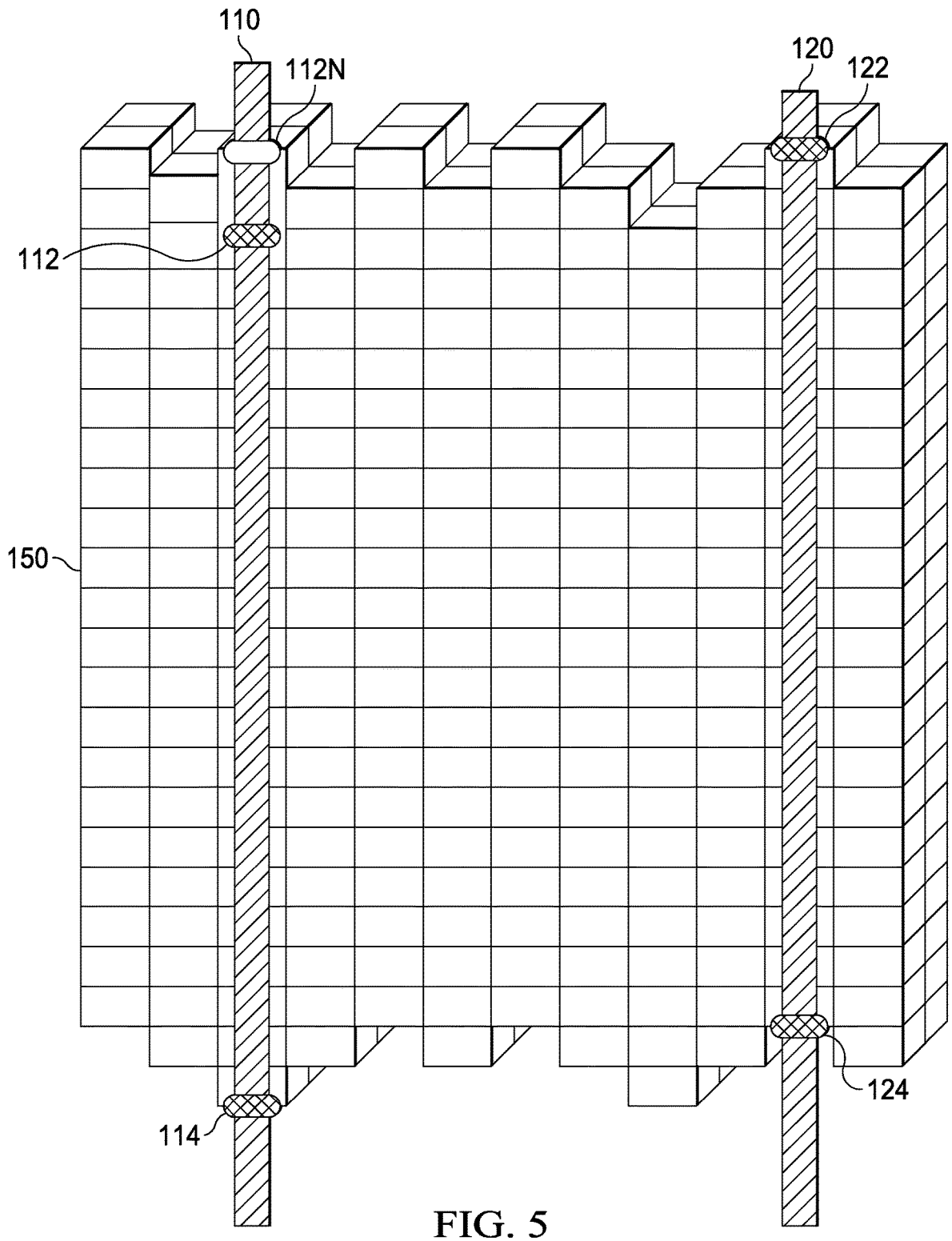
FIG. 5 is a diagram illustrating a second modification to the three-dimensional geocellular grid based on the indicated new top of the formation associated with the well of FIG. 3 in accordance with the disclosed embodiments.
Figure 6:
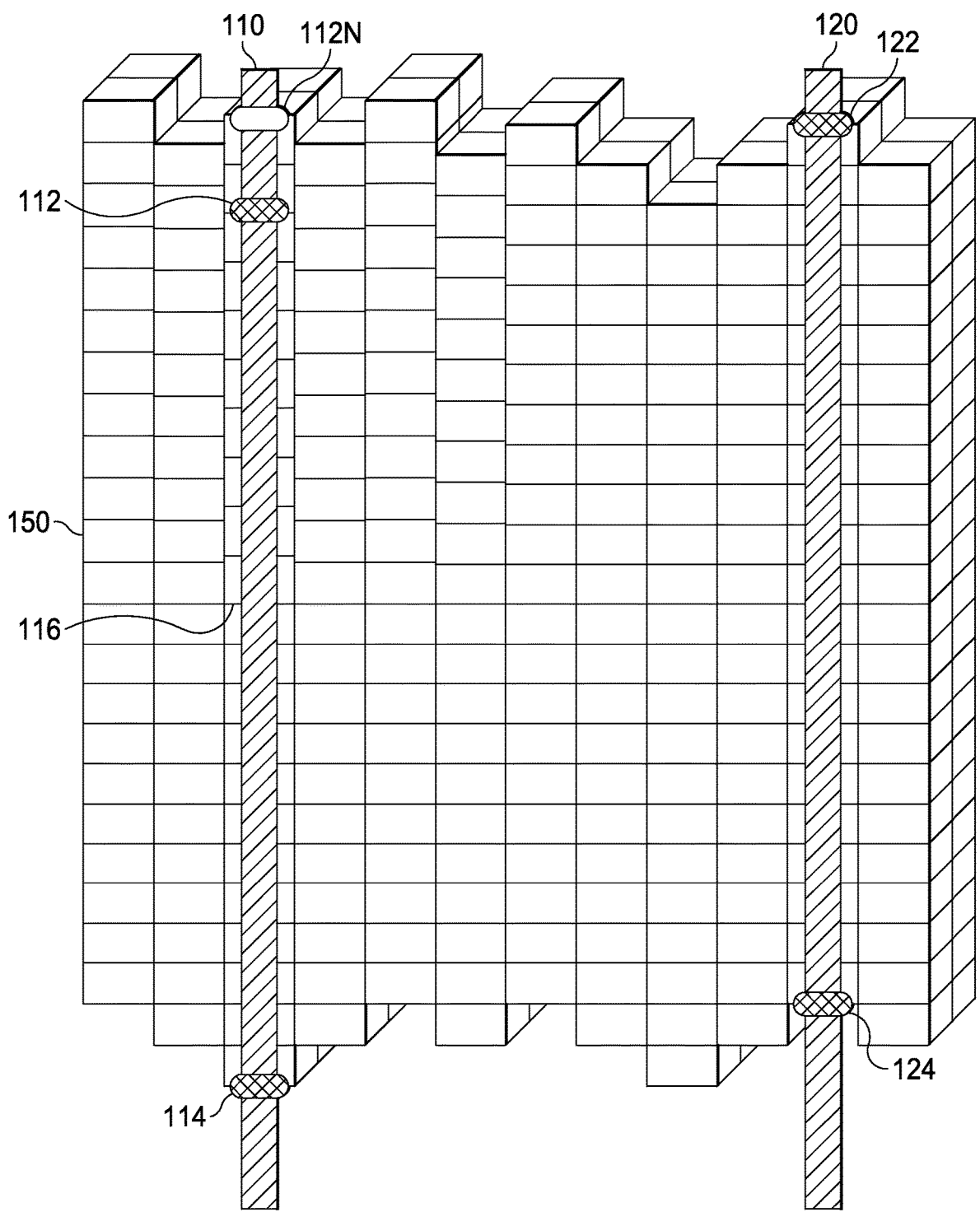
FIG. 6 is a diagram illustrating a third modification to the three-dimensional geocellular grid based on the indicated new top of the formation associated with the well of FIG. 3 in accordance with the disclosed embodiments.

For illustration purposes only, FIGS. 5 and 6 illustrate the local update change to the 3D geocellular model based on the indicated new top 112N of the formation 150 associated with the well 110 using different anchor points. For instance, FIG. 5 illustrates using the top 112 as an anchor point for stretching the blocked column corresponding to the well 110 to the new top 112N. As shown in FIG. 5, within the blocked column, only the top cell is stretched to the new top 112N. The cells in neighboring columns based on the top anchor point are also adjusted as described above. One advantage of this embodiment is that a least amount of cells are affected by the local update. However, the visual effect of the update is more severe than using other anchor points. For example, FIG. 6 illustrates using an intermediate anchor point 116 for stretching the blocked column corresponding to the well 110 to the new top 112N. As shown in FIG. 6, within the blocked column, only the cells between the intermediate anchor point 116 and the new top 112N is stretched. The neighboring cells within the affected volume are also slightly adjusted based on the intermediate anchor point. As can be seen for FIG. 6, the visual effect of the update is less apparent than that shown in FIG. 5.

Figure 7:
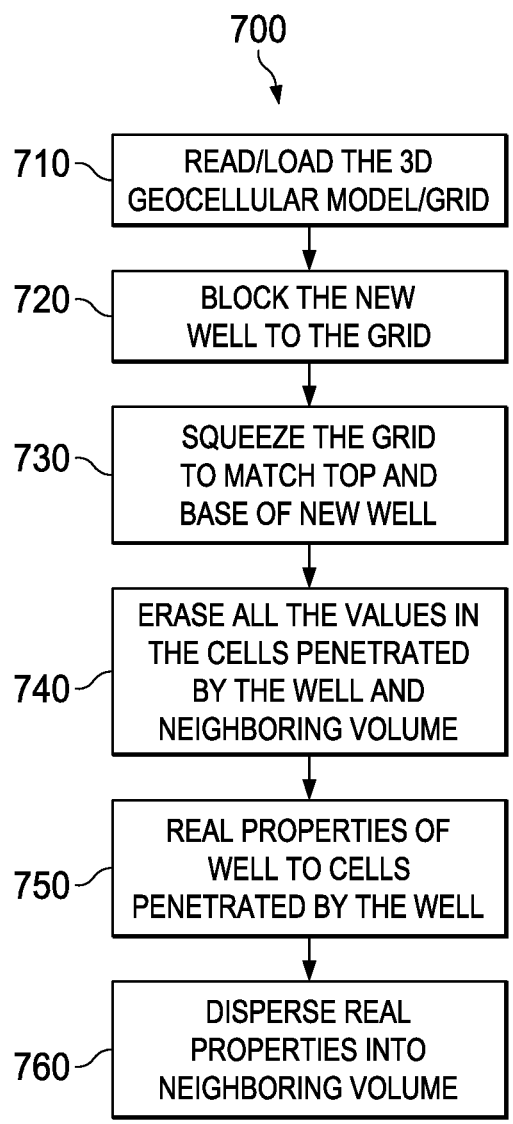
FIG. 7 is a flowchart illustrating a method for locally inserting a new well into a three-dimensional geocellular model in accordance with the disclosed embodiments.
Figure 8:
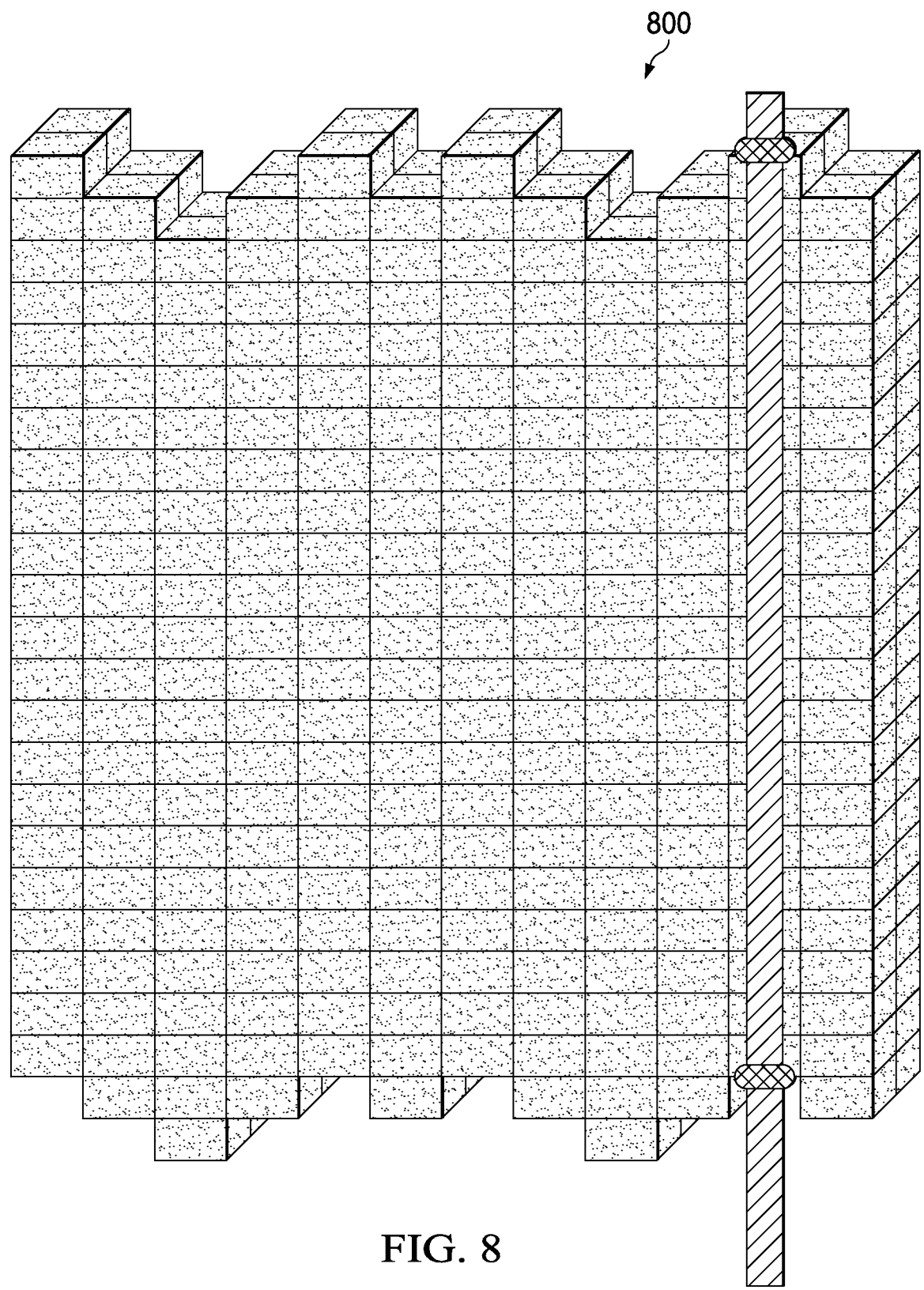
FIG. 8 is a diagram illustrating a three-dimensional geocellular grid prior to inserting a new well in accordance with the disclosed embodiments.
Figure 9:
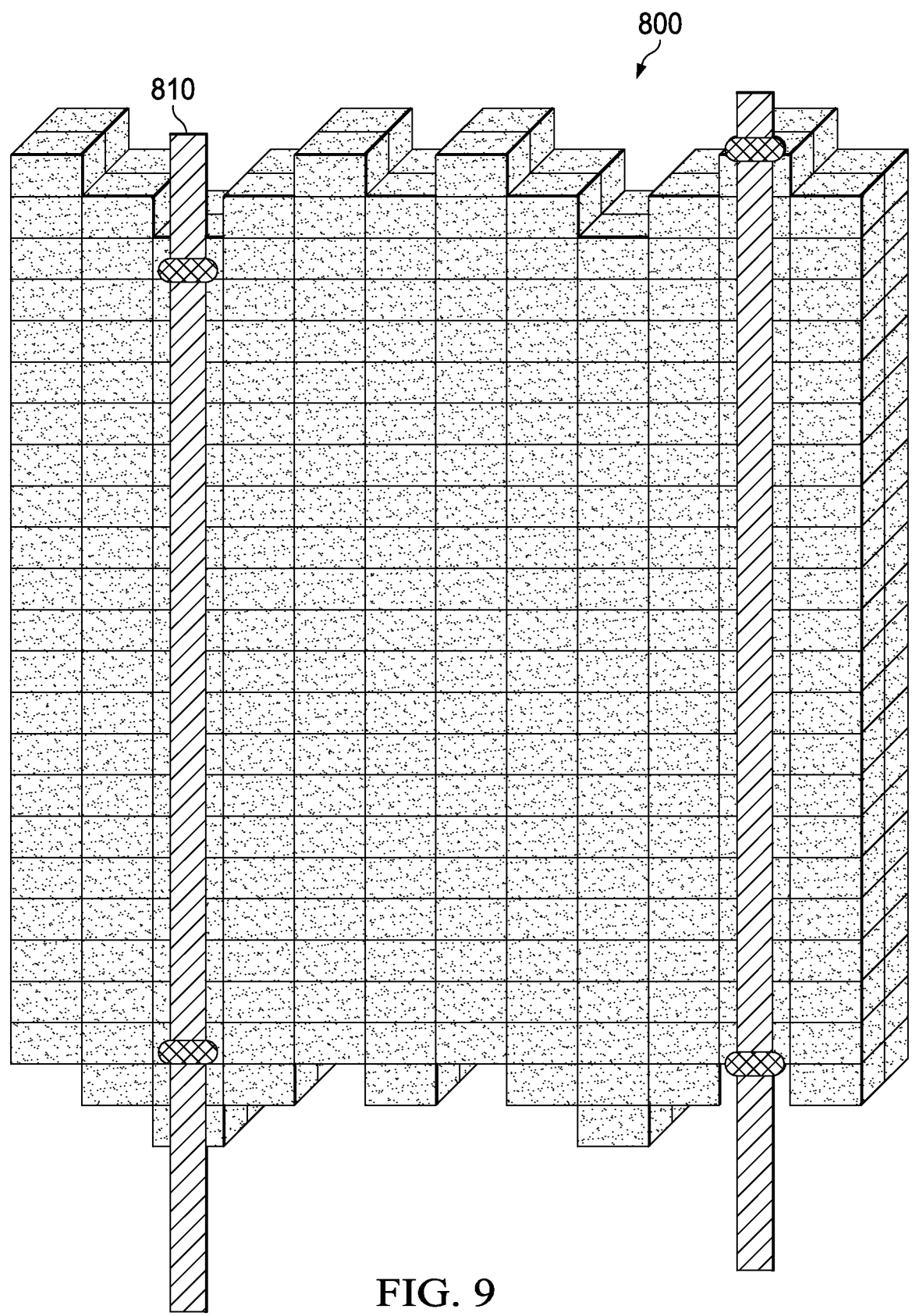
FIG. 9 is a diagram illustrating the three-dimensional geocellular grid of FIG. 8 with the new well blocked on the three-dimensional geocellular grid in accordance with the disclosed embodiments.

Referring now to FIG. 7, a flowchart illustrating an example of a method 700 for locally inserting a new real well into a 3D geocellular model/grid is presented in accordance with the disclosed embodiments. The method 700 begins by reading/loading the 3D geocellular model at step 710. At step 720, the method receives the new real well information and blocks the new well to the 3D geocellular grid (i.e., calibrates the location of the well to the grid). The new real well may be replacing a simulated well within the 3D geocellular grid or may be a new well added to the 3D geocellular grid. For example, FIG. 8 illustrates a portion of a 3D geocellular grid 800 prior to inserting a new well in accordance with one embodiment. FIG. 9 illustrates the portion of the 3D geocellular grid 800 with a new well 810 blocked to the 3D geocellular grid 800.

Figure 10:
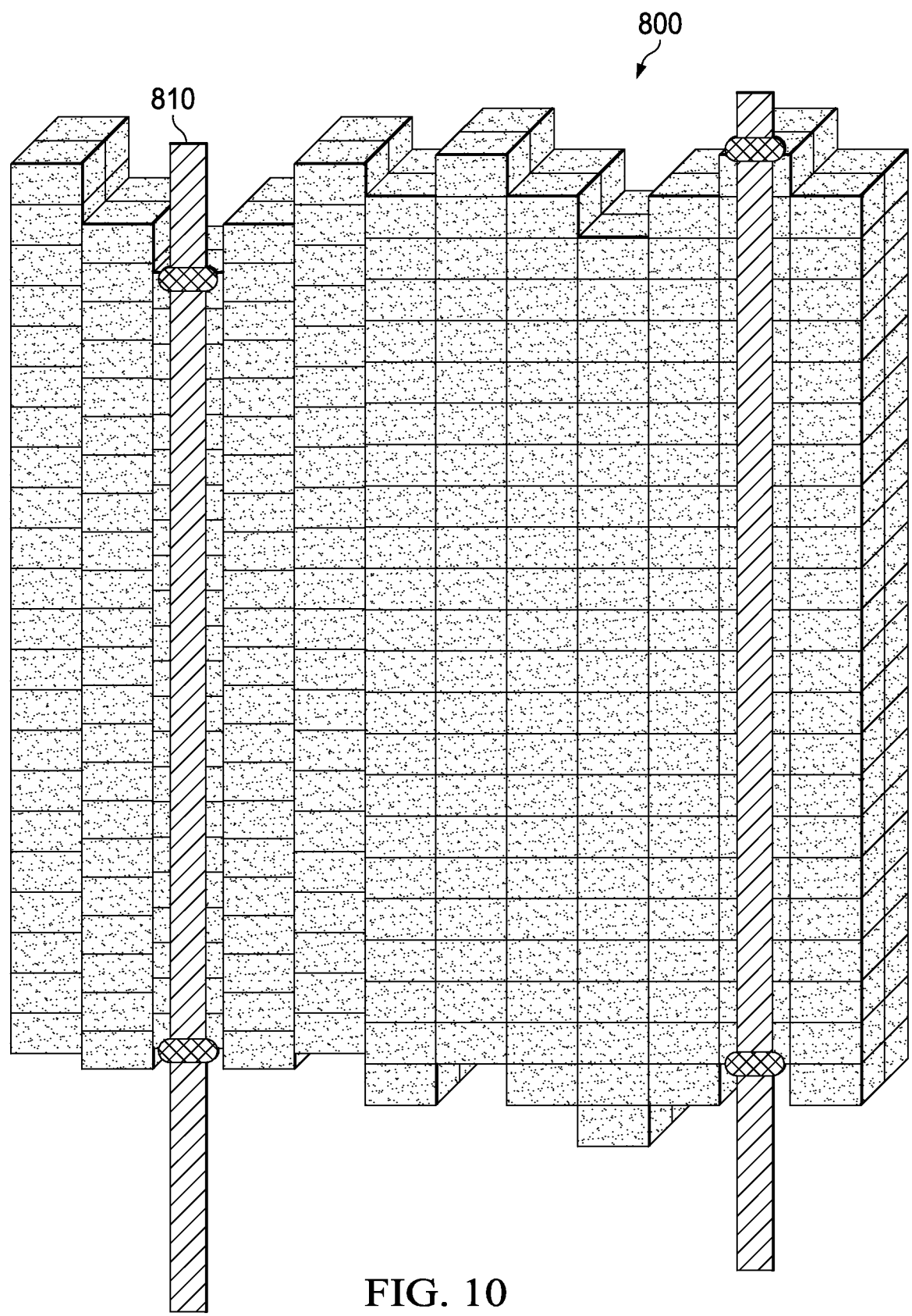
FIG. 10 is a diagram illustrating a modification to the three-dimensional geocellular grid of FIG. 9 to conform with the real top and base of the formation associated with the new well in accordance with the disclosed embodiments.

The method, at step 730, executes the squeeze/stretch procedure on the blocked cells and neighboring cell volume for locally modifying the 3D geocellular grid 800 to conform to the top and base of the new well 810 as illustrated in FIG. 10. As described above, this step may be performed using various anchor points.

Figure 11:
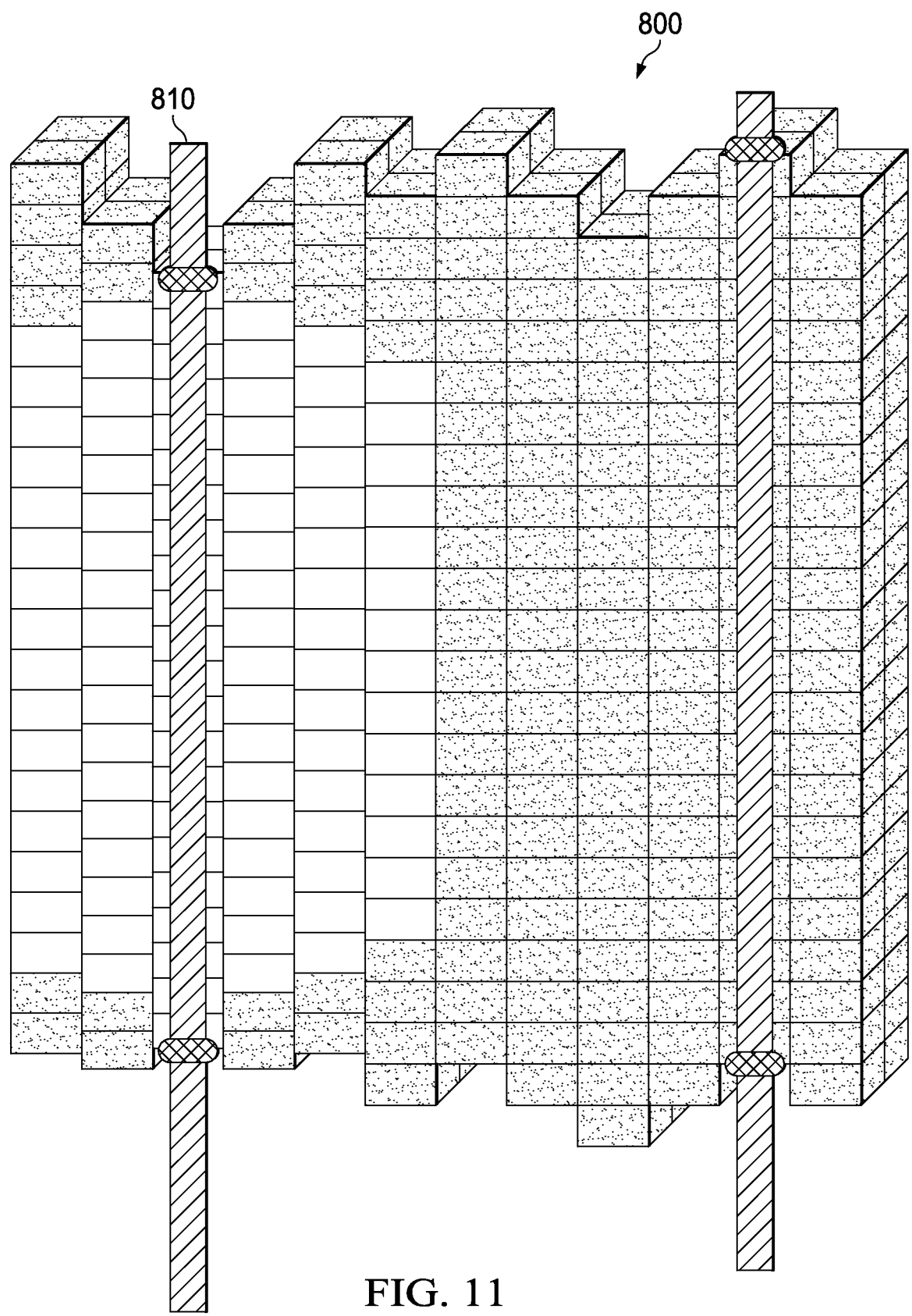
FIG. 11 is a diagram illustrating a modification to the three-dimensional geocellular grid of FIG. 10 with the simulated properties removed from the blocked cells and neighboring cells in the formation associated with the new well in accordance with the disclosed embodiments.

At step 740, the method erases/clears all the values indicating the properties (e.g., geologic, petrophysical, and mechanical properties) of each of the cells penetrated by the well and within the determined neighboring volume of cells as illustrated in FIG. 11. For instance, in one embodiment, each cell in the model is assigned a rock type. Additionally, in certain embodiments, each cell includes reservoir quality parameters such as, but not limited to, porosity and permeability.

Figure 12:
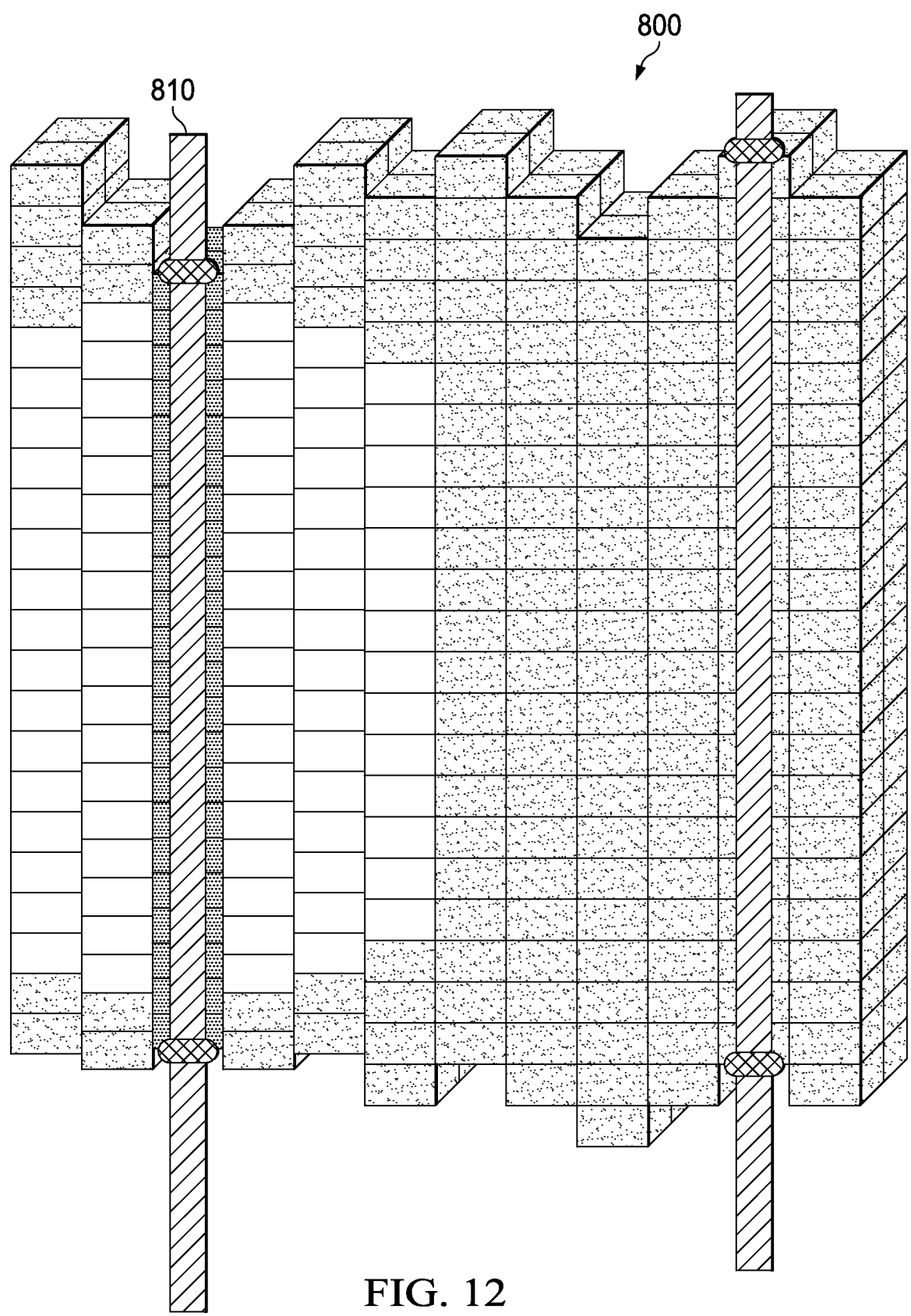
FIG. 12 is a diagram illustrating a modification to the three-dimensional geocellular grid of FIG. 11 that includes the real properties in the blocked cells associated with the new well in accordance with the disclosed embodiments.

The method, at step 750, sets the values indicating the properties of each of the cells penetrated by the well to the real/actual values based on the real properties determined from drilling the well as illustrated in FIG. 12. In one embodiment, the real/actual values provide a finer resolution than that provided in the 3D geocellular model/grid. For example, in one embodiment, the method may receive real/actual values associated with the geological properties for every ⅓ of a meter of the well, whereas the cells within the 3D geocellular model may be representative of a meter or several meters. In these embodiments, each of the cells in the 3D geocellular model may include several different property values. In certain embodiments, the method may average the values, select a best representative value, and/or combine the values using an algorithm to generate a representative value of the properties for the particular cell.

Figure 13:
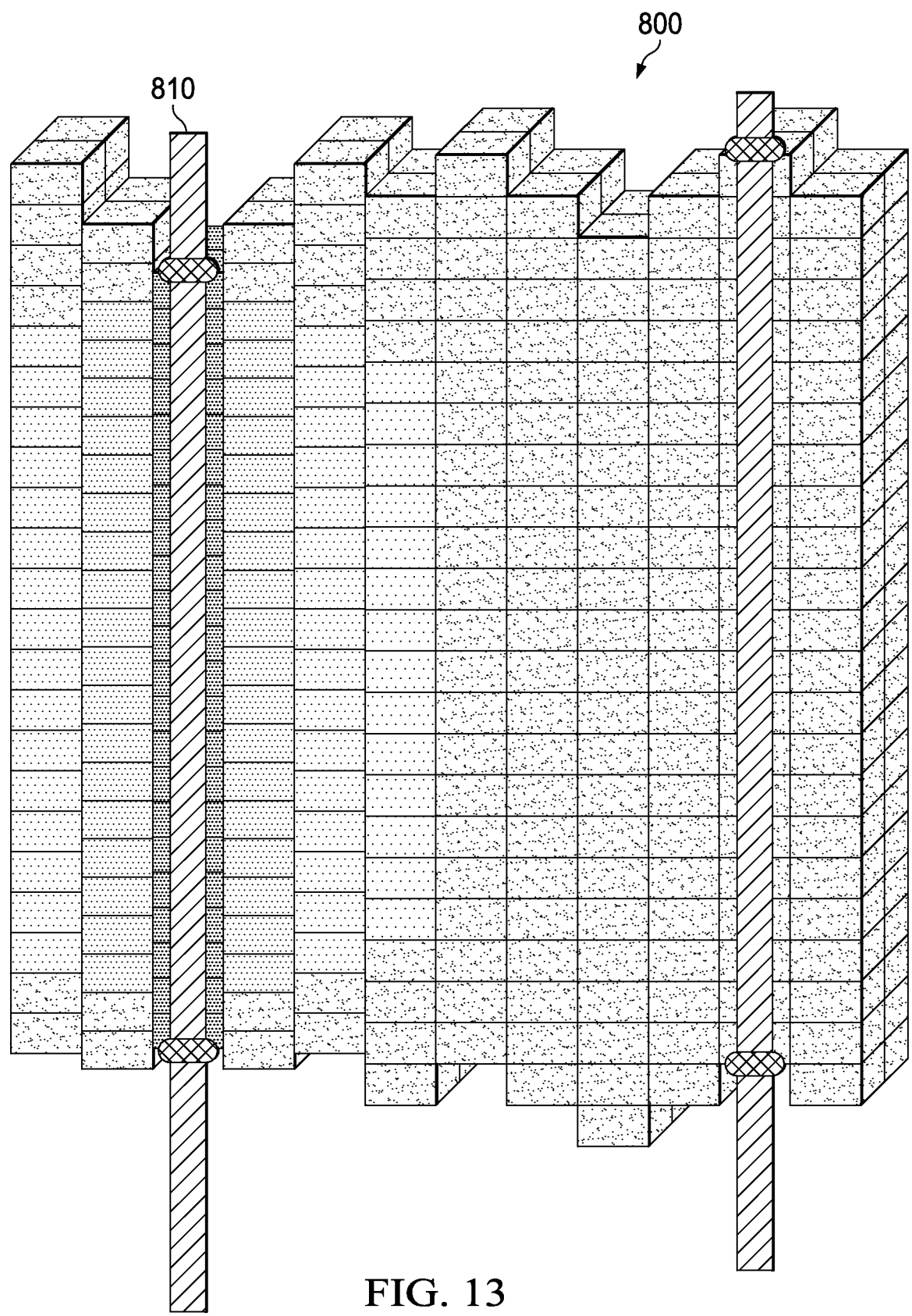
FIG. 13 is a diagram illustrating a modification to the three-dimensional geocellular grid of FIG. 12 to represent the propagation of the real properties of the formation to the neighboring cells in the formation associated with the new well in accordance with the disclosed embodiments.

Finally, at step 760, the method disperses the real properties to the neighboring volume of cells as shown in FIG. 13. In one embodiment, the method uses a function that determines the properties of the neighboring volume of cells based on the real properties determined from drilling the new well. In certain embodiments, the function may employ one or more of the following techniques: transition probabilities, inverse distance, flow simulation, co-located simulation, and statistical analysis.

Thus, the disclosed embodiments provide a system and method for providing local updating of a 3D geocellular model in response to a change in a geological model. In certain embodiments, the change may be at least one of modifying existing well data such as, but not limited to, a top or base of a formation corresponding to a well and/or the change may be the addition of a newly drilled well. One advantage of the disclosed embodiments is that the well planning process does not need to be delayed in response to a change in to a geological model as the process for performing the local updating of the 3D geocellular model can be performed quickly as compared to the time needed to regenerate the entire 3D geocellular model. In certain embodiments, the 3D geocellular model containing the local updates may be utilized as a temporary 3D geocellular model for making decisions regarding the operations of one or more wells, while the process rebuilds the entire 3D geocellular model with the new information.

Figure 14:
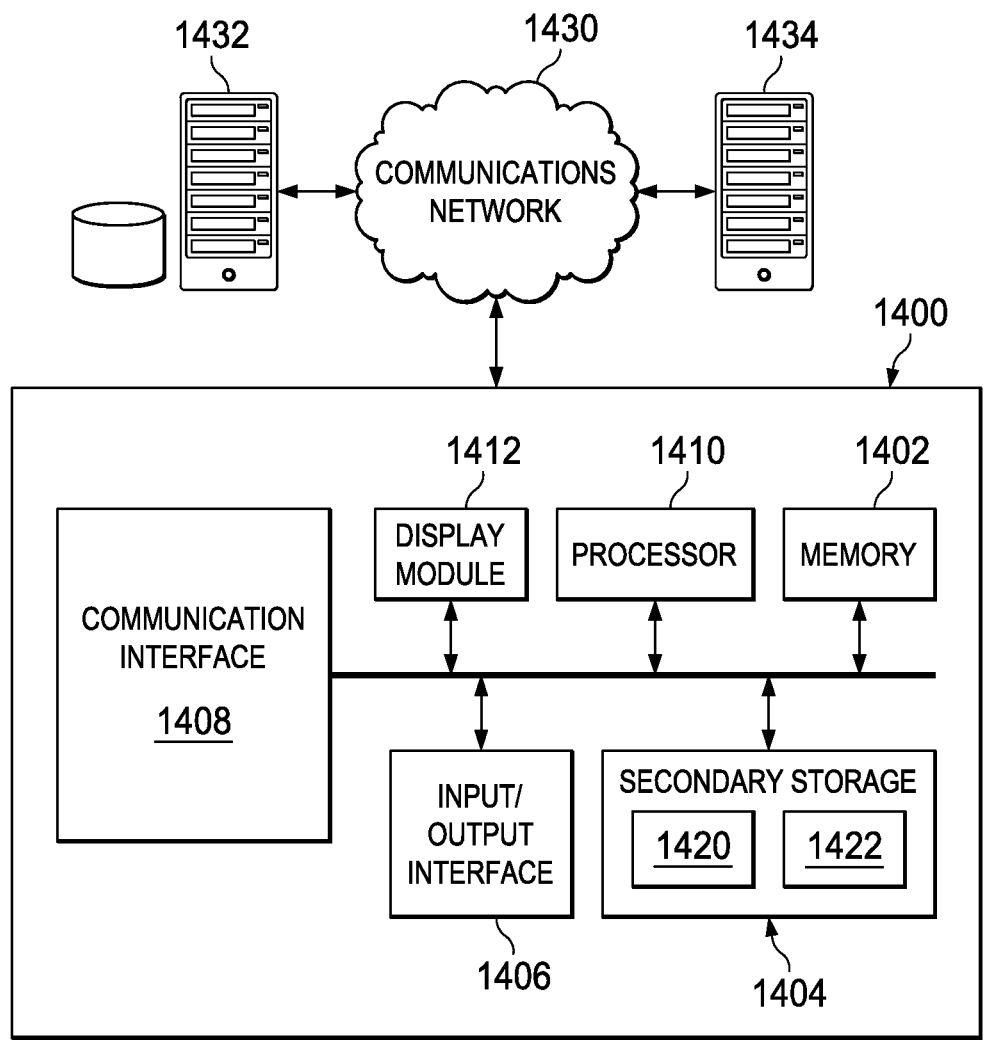
FIG. 14 is a block diagram illustrating one embodiment of a system for implementing the disclosed embodiments.

FIG. 14 is a block diagram illustrating one embodiment of a system 1400 for implementing the features and functions of the disclosed embodiments. The system 1400 includes, among other components, a processor 1400, main memory 1402, secondary storage unit 1404, an input/output interface module 1406, and a communication interface module 1408. The processor 1400 may be any type or any number of single core or multi-core processors capable of executing instructions for performing the features and functions of the disclosed embodiments.

The input/output interface module 1406 enables the system 1400 to receive user input (e.g., from a keyboard and mouse) and output information to one or more devices such as, but not limited to, printers, external data storage devices, and audio speakers. The system 1400 may optionally include a separate display module 1410 to enable information to be displayed on an integrated or external display device. For instance, the display module 1410 may include instructions or hardware (e.g., a graphics card or chip) for providing enhanced graphics, touchscreen, and/or multi-touch functionalities associated with one or more display devices. For example, in one embodiment, the display module 1410 is a NVIDIA® QuadroFX type graphics card that enables viewing and manipulating of three-dimensional objects.

Main memory 1402 is volatile memory that stores currently executing instructions/data or instructions/data that are prefetched for execution. The secondary storage unit 1404 is non-volatile memory for storing persistent data. The secondary storage unit 1404 may be or include any type of data storage component such as a hard drive, a flash drive, or a memory card. In one embodiment, the secondary storage unit 1404 stores the computer executable code/instructions and other relevant data for enabling a user to perform the features and functions of the disclosed embodiments.

For example, in accordance with the disclosed embodiments, the secondary storage unit 1404 may permanently store the executable code/instructions of an algorithm 1420 for local updating of a 3D geocellular model as described above. The instructions associated with the algorithm 1420 are then loaded from the secondary storage unit 1404 to main memory 1402 during execution by the processor 1400 for performing the disclosed embodiments. In addition, the secondary storage unit 1104 may store other executable code/instructions and data 1422 such as, but not limited to, a reservoir simulation application for use with the disclosed embodiments.

The communication interface module 1408 enables the system 1400 to communicate with the communications network 1430. For example, the network interface module 1408 may include a network interface card and/or a wireless transceiver for enabling the system 1400 to send and receive data through the communications network 1430 and/or directly with other devices.

The communications network 1430 may be any type of network including a combination of one or more of the following networks: a wide area network, a local area network, one or more private networks, the Internet, a telephone network such as the public switched telephone network (PSTN), one or more cellular networks, and wireless data networks. The communications network 1430 may include a plurality of network nodes (not depicted) such as routers, network access points/gateways, switches, DNS servers, proxy servers, and other network nodes for assisting in routing of data/communications between devices.

For example, in one embodiment, the system 1400 may interact with one or more servers 1434 or databases 1432 for performing the features of the present invention. For instance, the system 1400 may query the database 1432 for well log information in accordance with the disclosed embodiments. In one embodiment, the database 1432 may utilize OpenWorks® software available from Landmark Graphics Corporation to effectively manage, access, and analyze a broad range of oilfield project data in a single database. Further, in certain embodiments, the system 1400 may act as a server system for one or more client devices or a peer system for peer to peer communications or parallel processing with one or more devices/computing systems (e.g., clusters, grids).

While specific details about the above embodiments have been described, the above hardware and software descriptions are intended merely as example embodiments and are not intended to limit the structure or implementation of the disclosed embodiments. For instance, although many other internal components of the system 1400 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. For instance, with respect to the method 700 illustrated in FIG. 7, the steps 740 and 750, which respectively clears all the values in the affected cells and sets the values to the real values obtained during drilling, may be performed as a single step in which the old simulated values are simply replaced with the new real values. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In summary, the disclosed embodiments include a method, apparatus, and computer program product for locally updating a 3D geocellular model in response to a change in a geological model. In addition to the embodiments described above, many examples of specific combinations are within the scope of the disclosure, some of which are detailed below.

One example is a computer-implemented method for modifying a three-dimensional geocellular model, the method comprising: loading into memory the three-dimensional geocellular model, the three-dimensional geocellular model corresponding to a two-dimensional geological model; determining a portion of the three-dimensional geocellular model affected by a change to the two-dimensional geological model; and performing an update to the portion of the three-dimensional geocellular model affected by the change to the two-dimensional geological model.

In certain embodiments, as part of performing the update to the portion of the three-dimensional geocellular model affected by the change to the two-dimensional geological model, the computer-implemented method performs one of stretching and compressing a set of cells relative to an anchor point. The anchor point may be one of a top and a bottom of a formation associated with a well corresponding to the change or may be an intermediate point between the top and the bottom of the formation associated with the well. The set of cells relative to the anchor point may include a plurality of cells in the three-dimensional geocellular model that are blocked to a well associated with the change. Alternatively, or in addition to, in certain embodiments, the set of cells relative to the anchor point may include a neighboring volume of cells to the plurality of cells in the three-dimensional geocellular model that are blocked to the well associated with the change.

Additionally, in certain embodiments, the change to the two-dimensional geological model may be at least one of a change in a top and/or a bottom of a formation associated with a well in the three-dimensional geocellular model. The change to the two-dimensional geological model may also be the addition of a newly drilled well in certain embodiments of the computer-implemented method. Related to these embodiments, as part of performing the update to the portion of the three-dimensional geocellular model affected by the change to the two-dimensional geological model, the computer-implemented method may replace the simulated values corresponding to the simulated properties of a plurality of cells in the three-dimensional geocellular model that are blocked to the new drilled well with real values associated with real properties determined from drilling the new drilled well. Further, in certain embodiments, the computer-implemented method may modify the simulated properties of a neighboring volume of cells to the plurality of cells in the three-dimensional geocellular model that are blocked to the new drilled well in response to the real properties determined from drilling the new well. Each of the above features/functions may be combined singularly with the example embodiment or may be combined in various combinations with the example embodiment.

A second example is a system, comprising: at least one processor; and at least one memory coupled to the at least one processor and storing computer executable instructions for modifying a three-dimensional geocellular model, the computer executable instructions comprises instructions for: loading into memory the three-dimensional geocellular model, the three-dimensional geocellular model corresponding to a two-dimensional geological model; determining a portion of the three-dimensional geocellular model affected by a change to the two-dimensional geological model; and performing an update to the portion of the three-dimensional geocellular model affected by the change to the two-dimensional geological model.

Still, another example is a non-transitory computer readable medium comprising computer executable instructions for modifying a three-dimensional geocellular model, the computer executable instructions when executed causes one or more machines to perform operations comprising: loading into memory the three-dimensional geocellular model, the three-dimensional geocellular model corresponding to a two-dimensional geological model; determining a portion of the three-dimensional geocellular model affected by a change to the two-dimensional geological model; and performing an update to the portion of the three-dimensional geocellular model affected by the change to the two-dimensional geological model.

The above second and third example embodiments may similarly be modified as described above with respect to the first example embodiment. However the above specific example embodiments and modifications are not intended to limit the scope of the claims. For instance, the example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for locally updating a three-dimensional geocellular model of a formation, the method comprising:
    loading into memory the three-dimensional geocellular model, the three-dimensional geocellular model including a plurality of cells corresponding to points of the formation along a length of a first well that intersects a top surface and a bottom surface of the formation as represented within a two-dimensional geological model of the formation, wherein the top surface and the bottom surface of the formation correspond to locations associated with the first well in the two-dimensional geological model;
    receiving an indication of a change in location of at least one of the top surface of the formation or the bottom surface of the formation within the two-dimensional geological model, wherein the change is a new location added to the two-dimensional geological model for a second well within the formation;
    determining which of the plurality of cells of the three-dimensional geocellular model are affected by the change in location within the two-dimensional geological model, based on the received indication; and
    performing an update to one or more of the plurality of cells within a portion of the three-dimensional geocellular model in response to the change in location within the two-dimensional geological model, based on the determination.

2. The computer-implemented method of claim 1, wherein performing the update to the one or more cells within the portion of the three-dimensional geocellular model comprises performing at least one of a stretching or a compressing of a set of cells in the plurality of cells relative to an anchor point.

3. The computer-implemented method of claim 2, wherein the set of cells includes cells in the plurality of cells in the three-dimensional geocellular model that are blocked to the first well associated with the change in location within the two-dimensional geological model.

4. The computer-implemented method of claim 3, wherein the set of cells further comprises a neighboring volume of cells to the blocked cells in the plurality of cells in the three-dimensional geocellular model.

5. The computer-implemented method of claim 2, wherein the anchor point corresponds to one or more cells of the three-dimensional geocellular model at which the first well intersects at least one of the top surface of the formation or the bottom surface of the formation.

6. The computer-implemented method of claim 2, wherein the anchor point is an intermediate point between the top surface and the bottom surface of the formation.

7. The computer-implemented method of claim 1, wherein performing the update to the one or more cells within the portion of the three-dimensional geocellular model comprises:
 replacing simulated values indicating simulated properties for cells in the plurality of cells in the three-dimensional geocellular model that are blocked to the second well with real values indicating actual properties of the formation determined using data gathered from the second well.

8. The computer-implemented method of claim 7, further comprising modifying the simulated properties of a neighboring volume of cells to the blocked cells in the plurality of cells in the three-dimensional geocellular model based on the actual properties determined from the second well.

9. A system, comprising:
 at least one processor; and
 at least one memory coupled to the at least one processor and storing computer executable instructions for locally updating a three-dimensional geocellular model of a formation, the computer executable instructions comprises instructions for:
  loading into memory the three-dimensional geocellular model, the three-dimensional geocellular model including a plurality of cells corresponding to points of the formation along a length of a first well that intersects a top surface and a bottom surface of the formation as represented within a two-dimensional geological model, wherein the top surface and the bottom surface of the formation correspond to locations associated with the first well in the two-dimensional geological model;
  receiving an indication of a change in location of at least one of the top surface of the formation or the bottom surface of the formation within the two-dimensional geological model, wherein the change is a new location added to the two-dimensional geological model for a second well within the formation;
  determining which of the plurality of cells of the three-dimensional geocellular model are affected by the change in location within the two-dimensional geological model, based on the received indication; and
  performing an update to one or more of the plurality of cells within a portion of the three-dimensional geocellular model in response to the change in location within the two-dimensional geological model, based on the determination.

10. The system of claim 9, wherein the computer executable instructions further comprise instructions for performing at least one of a stretching or a compressing of a set of cells in the plurality of cells relative to an anchor point.

11. The system of claim 9, wherein the computer executable instructions further comprise instructions for:
 replacing simulated values indicating simulated properties for cells in the plurality of cells in the three-dimensional geocellular model that are blocked to the second well with real values indicating actual properties of the formation determined using data gathered from the second well; and
 modifying the simulated properties of a neighboring volume of cells to the blocked cells in the plurality of cells in the three-dimensional geocellular model based on the actual properties determined from the second well.

12. A non-transitory computer readable medium comprising computer executable instructions for modifying a three-dimensional geocellular model, the computer executable instructions when executed causes one or more machines to perform operations comprising:
 loading into memory the three-dimensional geocellular model, the three-dimensional geocellular model including a plurality of cells corresponding to points of the formation along a length of a first well that intersects a top surface and a bottom surface of the formation as represented within a two-dimensional geological model, wherein the top surface and the bottom surface of the formation correspond to locations associated with the first well in the two-dimensional geological model;
 receiving an indication of a change in location of at least one of the top surface of the formation or the bottom surface of the formation within the two-dimensional geological model, wherein the change is a new location added to the two-dimensional geological model for a second well within the formation;
 determining which of the plurality of cells of the three-dimensional geocellular model are affected by the change in location within the two-dimensional geological model, based on the received indication; and
 performing an update to one or more of the plurality of cells within a portion of the three-dimensional geocellular model in response to the change in location within the two-dimensional geological model, based on the determination.

13. The non-transitory computer readable medium of claim 12, wherein the computer executable instructions further comprise instructions for performing at least one of a stretching or a compressing a set of cells in the plurality of cells relative to an anchor point.

14. The non-transitory computer readable medium of claim 12, wherein the computer executable instructions further comprise instructions for:
 replacing simulated values indicating simulated properties for cells in the plurality of cells in the three-dimensional geocellular model that are blocked to the second well with real values indicating actual properties of the formation determined using data gathered from the second well; and
 modifying the simulated properties of a neighboring volume of cells to the blocked cells in the plurality of cells in the three-dimensional geocellular model based on the actual properties determined from the second well.

* * * * *